United States Patent [19]

McCance

[11] Patent Number: 5,269,261
[45] Date of Patent: Dec. 14, 1993

[54] ANIMAL SCRATCHING PAD AND AMUSEMENT DEVICE

[75] Inventor: Donald A. McCance, 7967 Lariat Cir., Broken Arrow, Okla. 74014

[73] Assignee: Donald A. McCance, Tulsa, Okla.

[21] Appl. No.: 962,688

[22] Filed: Oct. 19, 1992

[51] Int. Cl.[5] .............................................. A01K 29/00
[52] U.S. Cl. ...................................... 119/706; 119/707
[58] Field of Search ................ 119/28.5, 29; 446/168, 446/170, 419

[56] References Cited

U.S. PATENT DOCUMENTS

| | | | |
|---|---|---|---|
| 1,976,234 | 10/1934 | Larson | 119/28.5 X |
| 2,292,540 | 8/1942 | Norton | 119/28.5 |
| 3,486,485 | 12/1969 | Kahanick | 119/29 |
| 3,552,356 | 1/1971 | Rosenthal | 119/29 X |
| 4,722,299 | 2/1988 | Mohr | 119/29 |

Primary Examiner—Robert P. Swiatek
Attorney, Agent, or Firm—Head & Johnson

[57] ABSTRACT

An animal scratching pad and amusement device. The device includes a continuous track and a ball which is movable within and around the track. A receptacle has an open top for receiving a removable and replaceable scratch pad.

11 Claims, 2 Drawing Sheets

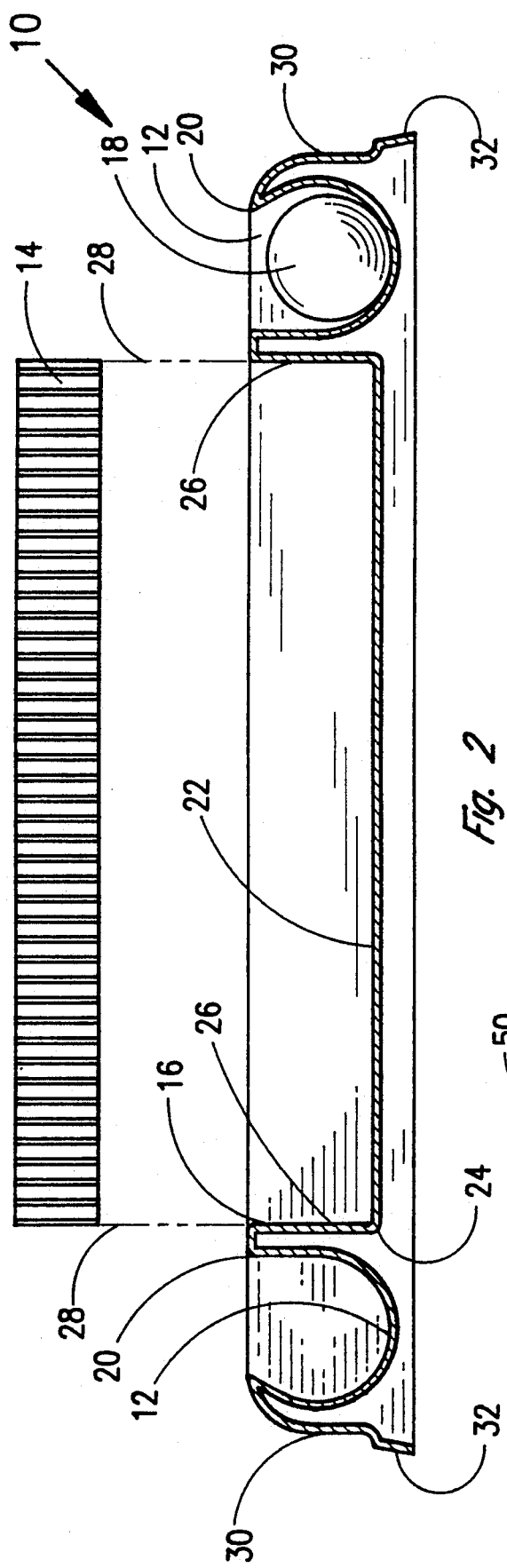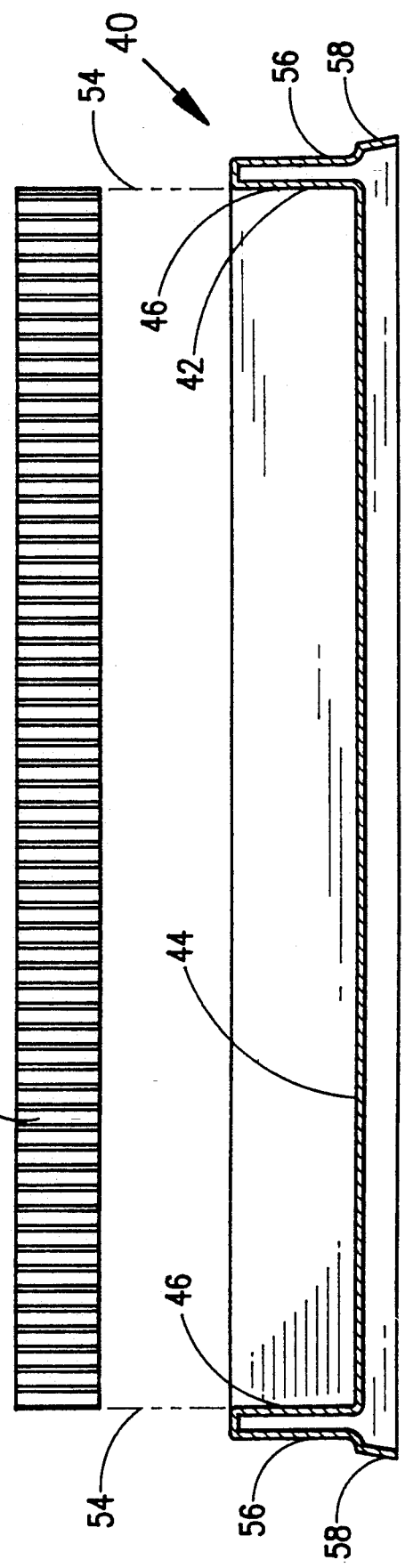

ANIMAL SCRATCHING PAD AND AMUSEMENT DEVICE

BACKGROUND OF THE INVENTION

1. Field of the Invention

The present invention pertains to an animal scratching pad and amusement device which will satisfy a cat's desire to scratch and claw, and at the same time, provide an amusement device for a cat.

2. Prior Art

It is well known that animals such as cats have a natural instinct which requires them to scratch or claw objects. Because of this, oftentimes, furniture and other household objects are damaged and destroyed despite training of the cats.

It is also known that animals such as cats will be amused and entertained by toys and other devices.

Various attempts have been made in the past to provide scratching or clawing devices for cats. Other devices have been constructed for the amusement of cats.

Kahanick (U.S. Pat. No. 3,486,485) discloses a clawing pad having a housing including an upwardly open chamber which would receive a honeycomb cardboard impregnated with catnip. The honeycomb cardboard is fastened to the housing and is neither removable nor replaceable. The flat base of the housing is prone to slide along the floor when used by a cat.

Mullin (U.S. Pat. No. 3,993,027) discloses a cat scratching post which is comprised of a series of vertically stacked corrugated cardboard pieces.

Goldson (U.S. Pat. No. 2,894,487) discloses a scratching post with a renewable or replaceable cover.

Gordon (U.S. Pat. No. 5,009,193) discloses a cat toy device having a circular track which is substantially enclosed. Oblong openings are formed on the top and portal openings are formed in the sides. Accordingly, the cat may move the ball within the track.

None of the prior art devices provides a scratching pad and amusement device for animals having a replaceable scratch pad and a base which will resist sliding on carpet or the like.

None of the prior art devices discloses or suggests a scratching pad and amusement device which combines a scratch pad for scratching and clawing along with a ball movable around a continuous track.

Accordingly, it is a principal object and purpose of the present invention to provide a scratching pad and amusement device for animals having a replaceable scratch pad for clawing and scratching and a base edge which will resist sliding or moving when in use.

It is a further object and purpose of the present invention to provide a scratching pad and amusement device for animals to both satisfy their scratching and clawing desires and to amuse and entertain.

SUMMARY OF THE INVENTION

The present invention provides an animal scratching pad and amusement device. In one embodiment, a continuous circular track in the form of a channel surrounds a scratch pad and receptacle.

A ball is contained within and is movable around the track. The track is arcuate in cross-section. The continuous track has a continuous longitudinal opening along the entire length of the track. The longitudinal opening is positioned at the top of the device so that it will be accessible.

The width of the longitudinal opening is slightly smaller than the diameter of the ball. Accordingly, while the ball may roll around and move freely within the track it will not easily be removed from the track through the opening.

The longitudinal opening is wide enough for the paw of a cat to easily fit therethrough. During play, the cat extends or sticks its paw through the longitudinal opening and pushes or strokes the ball.

The continuous track is slightly flexible. When the track is flexed, the longitudinal opening may be expanded slightly so that the opening will be slightly larger than the diameter of the ball, thereby allowing the ball to pass therethrough.

The receptacle includes a flat bottom plate having a substantially circular edge. Extending from the circular edge of the plate is an upstanding rim. The scratch pad will rest upon and be supported by the plate.

The diameter of the scratch pad is slightly larger than the diameter of the receptacle. Accordingly, the scratch pad will be snugly fit within the receptacle.

The device includes a base which terminates in a downwardly extending edge. The base is circular and extends from the track. The extending edge extends below the level of the flat plate so that the plate will not touch or rest on the floor. The extending edge is thus capable of sinking or digging into a carpet, blanket or other soft surface slightly.

BRIEF DESCRIPTION OF THE DRAWINGS

FIG. 2 is a sectional view taken along section line 2—2 of FIG. 1 of the animal scratching pad and amusement device shown in FIG. 1; and FIG. 3 is a sectional view of an alternate embodiment of an animal scratching pad and amusement device.

DETAILED DESCRIPTION OF THE PREFERRED EMBODIMENT

Figure 1:
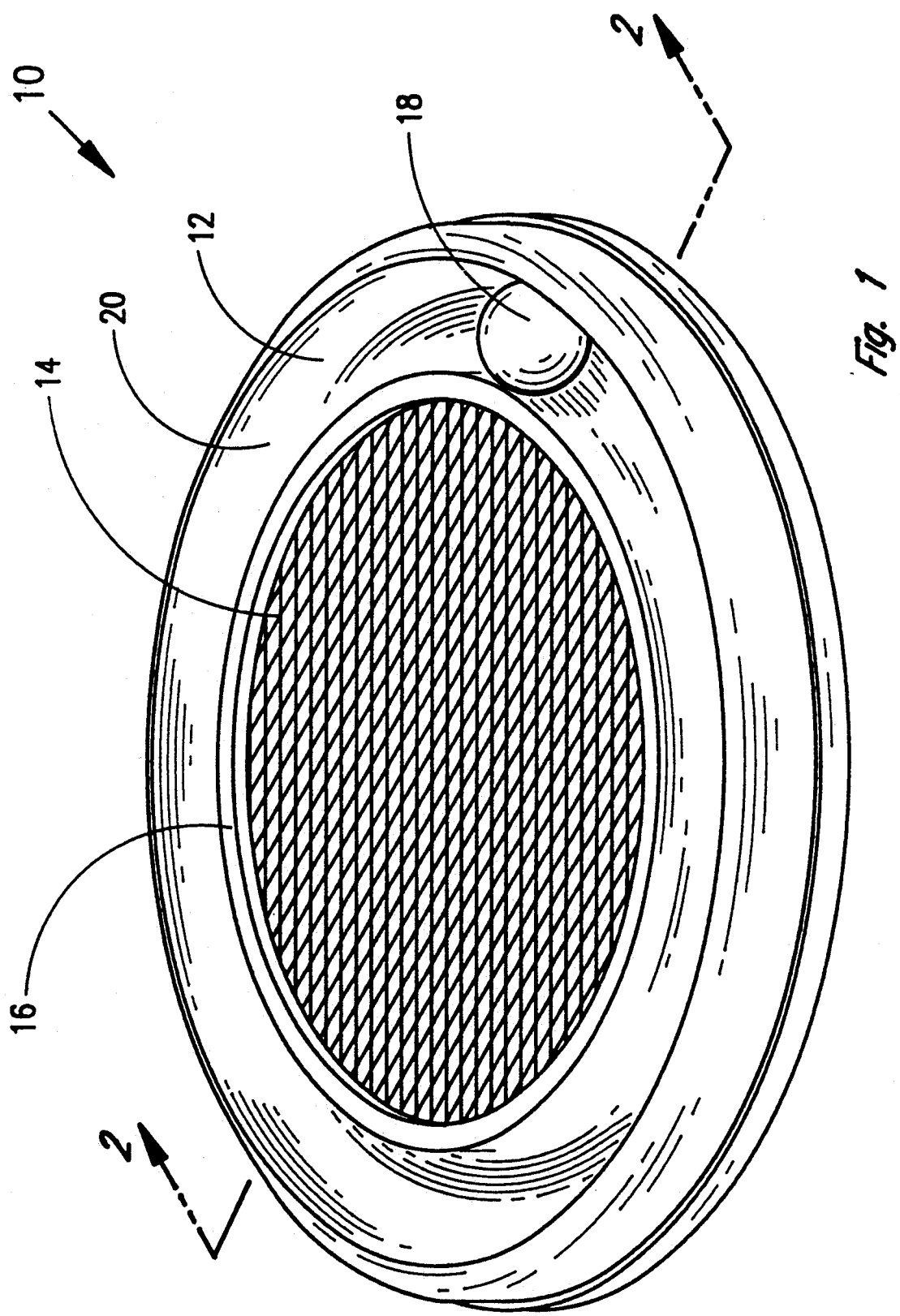
FIG. 1 is a perspective view of one embodiment of an animal scratching pad and amusement device constructed in accordance with the present invention.

Referring to the drawings in detail, FIG. 1 illustrates a perspective view of one embodiment of an animal scratching pad and amusement device 10 constructed in accordance with the present invention. The device 10 includes a continuous track 12 which is in the form of a channel. In the present embodiment, the continuous track 12 is circular and surrounds a scratch pad 14 and a receptacle 16 which will be described in detail herein. While the continuous track is circular in the present embodiment, it will be understood that other designs, such as oval or elliptical, are possible within the spirit of the invention.

A ball 18 is contained within and is movable around the track 12. The width of the track is such that the ball is easily movable within the track. It is advantageous to use a ball having a fair amount of mass so that when the ball is pushed or rolled within the track, inertia will keep the ball rolling within the track for an additional distance. FIG. 2 illustrates a sectional view taken along section line 2—2 of FIG. 1. The scratch pad 14 has been lifted out of the receptacle and is shown apart therefrom. With reference to the sectional view shown in FIG. 2 and with continuing reference to FIG. 1, the continuous track 12 has a continuous longitudinal opening 20 along the entire length of the track 12. The longitudinal opening 20 is positioned at the top of the device 10 so that it will be accessible to an animal (not shown)

or to a human (not shown). The ball may be inserted or withdrawn from the track 12 through the opening.

The longitudinal opening 20 will also allow the animal access to the ball 18 while it is in the track.

As best seen in FIG. 2, the track is arcuate in cross-section. The width of the continuous opening 20 is slightly smaller than the diameter of the ball 18. Accordingly, while the ball 18 may roll around and move freely within the track, it will not easily be removed from the track through the opening.

The longitudinal opening is wide enough for the paw of a cat to easily fit therethrough. During play, the cat will extend or stick its paw through the opening and push or stroke the ball.

The continuous track 12 is slightly flexible. If the track 12 is flexed, the opening 20 may be expanded slightly so that the opening will be slightly larger than the diameter of the ball to allow the ball 18 to pass therethrough. Accordingly, it is possible to insert or remove the ball 18 through the longitudinal opening. In practice, the ball 18 may be grasped firmly in the fingers while in the track and pulled so that the track will flex slightly, expanding the opening and allowing the ball to pass therethrough. To insert the ball into the track, the reverse procedure is performed. The ball is grasped firmly and pushed until the track flexes.

It has been found that a cat will readily and actively play with the ball and move it around the track 12. At the same time, it has been found that cats are not able to remove the ball from the track 12 through the longitudinal opening 20. Accordingly, while a human may expand the diameter of the longitudinal opening to allow for insertion or withdrawal of the ball, it has been found that a cat will have extreme difficulty in trying to remove the ball from the track.

The receptacle 16 includes a flat bottom plate 22 as best seen in FIG. 2. In the present embodiment, the plate has a substantially circular edge 24. When the scratch pad 14 is inserted within the device, it will rest upon and be supported by the flat plate 22. Extending from the circular edge 24 of the plate is an upstanding rim 26. The upstanding rim extends vertically from the plate.

In FIG. 2, the scratch pad has been removed out of the receptacle. Dashed lines 28 illustrate the removal or insertion of the scratch pad into the receptacle 16. As best seen in FIG. 1, when the scratch pad 14 is inserted in the receptacle, the upstanding rim 26 is deep enough so that the scratch pad 14 is below the level of the top of the rim. This will prevent a cat from easily pulling the scratch pad out of the receptacle. It will also assist in keeping any chips or pieces of the scratch pad within the receptacle.

The diameter of the scratch pad 14 is slightly larger than the diameter of the receptacle. For instance, the scratch pad might be ¼" larger than the receptacle. Accordingly, once the scratch pad is inserted, it will be snugly fit within the receptacle and will resist coming back out.

The device 10 also includes a base 30 which terminates in a downwardly extending edge 32. In the present embodiment, both the track 12 and the receptacle 16 are inside of the base 30 which surrounds the track and receptacle. The base 30 is circular and extends from the track.

The extending edge 32 forms a continuous circle. The extending edge extends below the level of the flat plate 22 as seen in FIG. 2. The downwardly extending edge 32 will, thus, rest on the floor or carpet (not shown). The flat plate 22 which retains the scratch pad will not touch or rest on the floor or carpet. It has been found that the extending edge will sink or dig into the carpet, blanket or other soft surface slightly thereby resisting any sliding or lateral movement of the device when the device is clawed or played with by a cat. This has been found to be superior to prior devices which, with a flat bottom surface, slide or move when used by a cat. Additionally, with the extending edge digging into a carpet, it is difficult for a cat to place its paw under the device to overturn it.

The base is designed substantially in the shape of a frustum, which also discourages cats from overturning the device.

The base 30, continuous track 12, upstanding rim 26 and flat plate 22 may all be constructed of a single molded plastic item. This not only facilitates easily manufacture but allows for the required flexibility of the track.

The scratch pad may be made of honeycomb, verticell or corrugated-type material. Catnip may be sprinkled or dispersed on the scratch pad and will fall within the openings of the scratch pad. It has been found that cats enjoy circling around the scratch pad and even lying thereon. The circular design of the scratch pad is advantageous to allow these activities.

It has been found that cats will be attracted to the device and actively claw and scratch the scratch pad. The cats will then ignore scratching or clawing the furniture and other household items.

FIG. 3 shows a sectional view of an alternate embodiment 40 of the present device. The device 40 includes a receptacle 42 having a flat plate 44 and upstanding rim 46 and an open top. A removable scratch pad 50 is receivable in the receptacle. The dashed lines 54 illustrate insertions of the honeycomb into the receptacle. The dashed lines 54 illustrate insertions of the honeycomb into the receptacle. The device 40 also includes a base 56 which terminates in a downwardly extending edge 58.

The extending edge extends below the level of the flat plate so that the downwardly extending edge will, thus, rest on the floor or carpet. The flat plate will not touch or rest on the floor or carpet.

It has been found that it is advantageous to construct the scratch pad slightly larger in diameter than the receptacle so that the scratch pad will fit and be retained snugly within the receptacle.

In either embodiment, after a cat or cats have scratched or clawed on the surface of a scratch pad for a period of time, the scratch pad will become worn somewhat. Once this has occurred, the scratch pad may be removed and turned over so that the scratch pad may be reused. It will thus be seen that the scratch pad will have twice the usable life of a scratch pad which does not have opposed surfaces.

After both opposed surfaces have become worn, the scratch pad may be replaced with a new scratch pad.

Whereas, the present invention has been described in relation to the drawings attached hereto, it should be understood that other and further modifications, apart from those shown or suggested herein, may be made within the spirit and scope of this invention.

What is claimed is:

1. An animal scratching pad and amusement device, which comprises:

an open-topped continuous track, said track having an arcuate transverse cross-section;
a ball movable around said track;
a receptacle having an open top; and
a removable scratchpad receivable in said receptacle.

2. An animal scratching pad and amusement device as set forth in claim 1 wherein said continuous track is circular and surrounds said scratch pad and said receptacle.

3. An animal scratching pad and amusement device as set forth in claim 1 wherein said continuous track has a continuous longitudinal opening to allow insertion or removal of said ball and to allow an animal access to said ball while in said track.

4. An animal scratching pad and amusement device as set forth in claim 3 wherein the width of said longitudinal opening is slightly smaller than the diameter of said ball and including means to flex said continuous track laterally so that said longitudinal opening is wider than the diameter of said ball to flow for insertion or removal of said ball.

5. An animal scratching pad and amusement device as set forth in claim 1 wherein said scratchpad is slightly larger in area than said receptacle and said scratch pad is compressible so that said scratchpad will fit snugly within said receptacle.

6. An animal scratching pad and amusement device as set forth in claim 1 wherein said scratch pad has opposed scratching surfaces so that said scratch pad may be reused after one said surface is worn.

7. An animal scratching pad and amusement device as set forth in claim 1 including means to resist movement of the device on a flat surface including a base having an extending edge extending below the level of said plate so that only said extending edge will contact said flat surface and thereby resist movement.

8. An animal scratching pad and amusement device as set forth in claim 7 wherein said base is in the shape of a frustum.

9. An animal scratching pad and amusement device as set forth in claim 1 wherein said scratch pad is composed of an open cell material such as honeycomb, verticell or corrugated-type material.

10. An animal scratching pad and amusement device, which comprises:
a continuous track;
a ball movable around said track;
a receptacle having an open top;
a continuous longitudinal top opening in said track to allow insertion or removal of said ball and to allow an animal access to said ball while in said track, said continuous longitudinal opening being aligned with said open top so that said longitudinal opening is visible from outside said device; and
a removable honeycomb scratchpad receivable in said receptacle.

11. An animal scratching pad and amusement device, which comprises:
a continuous track;
a ball movable around said track;
a receptacle having a flat bottom plate, an upstanding rim extending from said bottom plate, and an open top; and
a removable honeycomb scratchpad receivable in said receptacle.

* * * * *